United States Patent [19]

Peterson

[11] 4,448,565

[45] May 15, 1984

[54] STRESS RELIEVING NUT MEMBER

[75] Inventor: Francis C. Peterson, St. Charles, Ill.

[73] Assignee: Illinois Tool Works Inc., Chicago, Ill.

[21] Appl. No.: 359,004

[22] Filed: Mar. 17, 1982

[51] Int. Cl.³ .............................................. F16B 5/02
[52] U.S. Cl. ..................................... 403/408; 411/427
[58] Field of Search ................. 411/427, 82, 337, 172, 411/174, 175, 173, 176, 180; 403/408, 407, 406

[56] References Cited

U.S. PATENT DOCUMENTS

| | | | |
|---|---|---|---|
| 2,632,355 | 3/1953 | Becker | 411/427 |
| 2,883,012 | 4/1959 | Hoffman | 403/408 |
| 3,414,304 | 12/1968 | Miller | 403/408 |
| 3,747,657 | 7/1973 | Ryder | 411/82 |
| 4,238,165 | 12/1980 | Wagner | 403/408 |

FOREIGN PATENT DOCUMENTS 630903 10/1949 United Kingdom ................ 403/408

Primary Examiner—Andrew V. Kundrat
Attorney, Agent, or Firm—Thomas W. Buckman; Donald D. Mondul; David I. Roche

[57] ABSTRACT

A nut member and composite joint configuration designed to eliminate compressive stress on work panels that are fragile. A nut with a tubular section and a flange, which is spaced both radially and axially from one extremity of the tube and provided with an adhesive surface, may be inserted from one side of the fragile panel so that the end of the tubular section is spaced within the aperture in the fragile panel. Compressive clamping forces applied by a male member draws the end up into abutment with the overlying panel while the adhesive absorbs much of the stress in the joint.

6 Claims, 9 Drawing Figures

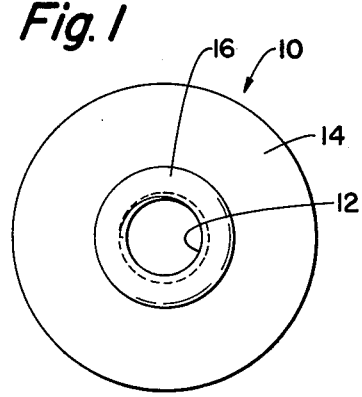
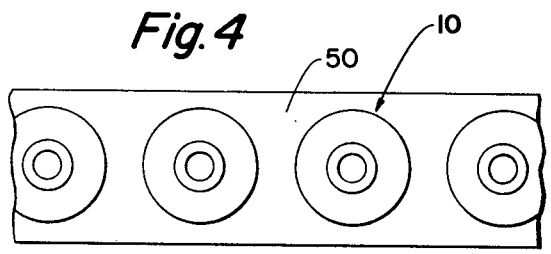
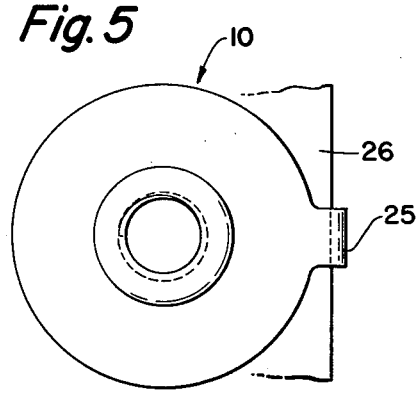
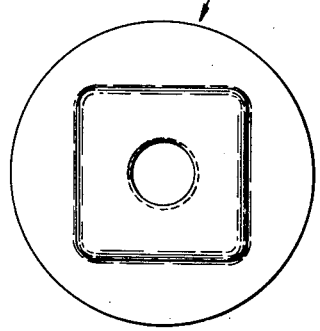
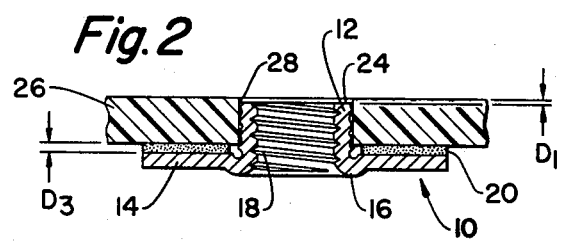
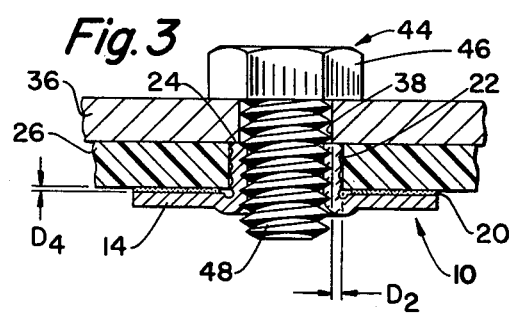
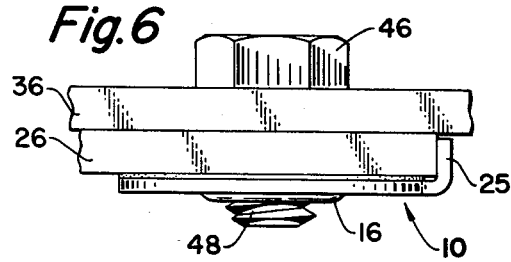
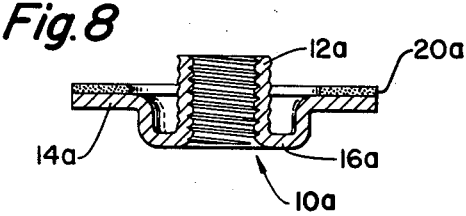
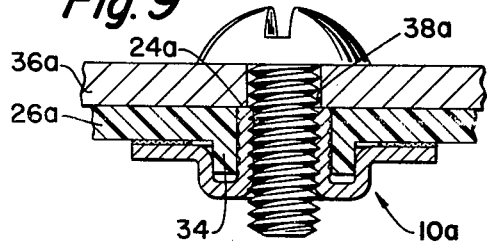

STRESS RELIEVING NUT MEMBER

BACKGROUND OF THE INVENTION

This invention relates broadly to a preassembled nut and workpiece system, and more particularly to a clamping joint assembly designed to secure one workpiece to a fragile workpiece.

With the increasing use of plastic and plastic-like filled material to replace steel and other steel metal materials, the problem of reducing the compressive stress on one or more work panels being fastened together becomes more important.

A series of structural plastic materials, which may broadly be described as including some sort of fill in the thermo-plastic structure, creates special problems in that they are unusually susceptible to fracture or otherwise deteriorate when placed under clamping stress. This failure in the plastic-like panel can also be accelerated when the panel is under stress and then the joint is also subjected to environmental changes such as moisture, heat, cold, etc.

The purpose of this invention is to provide a nut member and a joint which includes a particularly designed nut member which relieves and isolates compressive stress from the critical frangible panels.

It is, thus, an object of the invention to provide a fastener member, namely a nut device which is capable of being associated with a fragile panel and that can thereafter be utilized with a male threaded fastener member to compressingly attach a second work panel to the first fragile member without creating stresses on the fragile panel which would tend to fracture or otherwise fail.

These objects are accomplished by a tubular nut member which has a tubular section of a predetermined length and further includes a radially extending flange from adjacent one extremity of the tube. The flange is configured so that its innermost periphery is spaced slightly both in a radial direction and the axial direction downwardly from the extremity of the tube. The flange is planar and is oriented to lie in a plane generally perpendicular to the axis of the tube with one surface of the flange being coated or provided with a layer of adhesive material. A further aspect of the invention is the dimensional relationship between the apertures in the panel to be attached and the aperture in the fragile panel. The preformed hole in the panel to be attached should be slightly smaller than the preformed hole in the fragile panel to permit the extremity of the tubular section to abut against the other panel as it is resiliently compressed during application based upon the hinge or rim that separates or spaces the flange from the extremity. The combination of the spring take-up and isolation of the compression by virtue of the columnar effect of the tube in addition to the secondary compression isolation resulting from the layer of adhesive completely eliminates stress at the region surrounding the hole in the fragile panel.

BRIEF DESCRIPTION OF THE DRAWINGS

FIG. 1 is a top plan view of the nut member utilized in this invention;

FIG. 2 is a side elevational view in section showing the nut member preassembled to the fragile workpiece;

FIG. 3 is a side elevational view in partial section of the completed joint utilizing the invention;

FIG. 4 is a top plan view of a series of nut elements preassembled to a carrying strip;

FIG. 5 is a top plan view of an alternate embodiment of the nut member of the invention;

FIG. 6 is an elevational view of a joint assembled utilizing the alternate embodiment;

FIG. 7 is a top plan view of an alternate embodiment of the nut member of the invention designed for a special work panel;

FIG. 8 is a side elevational view in section showing the alternate embodiment of FIG. 7 of the invention; and FIG. 9 is a side elevational view in partial section of a completed joint utilizing the invention in FIGS. 7 and 8.

DETAILED DESCRIPTION OF THE PREFERRED EMBODIMENTS

The fastener unit 10 shown in FIGS. 1 through 3 may generally be described as a nut member. The nut member 10 includes a tubular section 12 having a radially extending flange 14 at one extremity. The flange is spacingly, integrally interconnected to the one extremity of the tube by a rim section 16. It will be clear from FIG. 2 that the rim section 16 both slightly spaces the flange inner perimeter radially from the tubular section as well as axially downwardly from the extremity. The purpose of this rim and spacing will be described later herein.

It is important to note also that the flange is planar in configuration and extends in a plane generally perpendicular to the axis of the tubular section so that the compressive load is evenly distributed over a relatively large surface.

Turning more particularly to FIGS. 2 and 3, it will be shown that the nut number 10 is designed to be preassembled to one side of a fragile workpiece 26 through the use of an adhesive layer 20 formed between the planar surface of the flange 14 and the planar surface of the workpiece surrounding an aperture 28 formed in the fragile workpiece. The workpiece and nut member are designed so that the thickness of the workpiece 26 and the axial extent of the tubular member interlate to create a slight spacing, shown in FIG. 2 as dimension $D_1$ in its preassembled condition. This dimension $D_1$ is designed to permit the tube to telescopically more relative to the compression forces created by the insertion of a mating fastener as will be shown in FIG. 3 and described later herein.

While the fragile workpiece 26 may be any type of workpiece which requires isolation or protection from compressive stresses, it has been found that the invention is particularly useful in material such as "LEXAN" and other glass filled or mineral filled materials which are susceptible to deterioration or cracking when placed under direct compressive stress.

Once the nut device 10 is preassembled to one or more apertures in the fragile workpiece, the clamping or securing operation can then be finished without fear of immediate or subsequent damage to the fragile workpiece.

FIG. 3 shows such a completed joint wherein a second work panel 36 is placed over the first work panel 26 so that apertures 38 in the second workpiece register with the apertures 28 in the first workpiece. It should be noted that the apertures 38 are preferably of a lesser transverse dimension than the apertures 28 creating a radial overlap described as in $D_2$ in FIG. 3. A threaded fastener designed to mate with the helical threads 18 in the nut member and including a head 46 and a threaded shank 48 may then be placed through the aperture 38 in the workpiece and into clamping threaded engagement with a nut member 10. As the threaded engagement continues, creating clamping forces, the nut member acts to isolate the clamping stresses from the fragile member in two ways. Firstly, the rim section 16 creates a hinge permitting the tubular section to move axially toward the head of the bolt. This spring-like movement reduces the stress directly on the fragile workpiece.

Secondly, the spacing of the flange which bears the clamping pressure both radially and axially from the tube eliminates the edge contact between the aperture 28 and the nut member which could create undo unit stresses at that point.

Thirdly, the adhesive layer 20 itself forms a stress absorbing layer, as shown by the difference in dimensions $D_3$ and $D_4$ in FIGS. 2 and 3.

It should be noted that the dimensional relationship between the panel 26 and the tubular section permits a clamping between the extremity of the tube 24 and the surface surrounding the aperture 38. Thus, the movement of the tube and compressive stresses are limited and controlled without fear of overstressing or overtorquing.

As shown in FIG. 4, the nut members 10 themselves may be preassembled to a carrier strip 50 and may thereafter be peeled off from the strip for automated assembly into the apertures in the work panel.

The joint may further be enhanced by subsequent applications of, either heat, if the adhesive is designed to be heat activated, or pressure, if the adhesive is a two-part pressure activated system. The non-rotative relationship between the work panel 26 can be enhanced by ultrasonic energy applications to the joint which could permit the aperture walls 28 to flow into mechanical contact with the ribs or helixes 22 formed at the outer periphery of the device.

Embodiments of the invention shown in FIGS. 5 and 6 show a further mechanical means which will prevent the rotation of the nut during the fastening operation in that the nut member can be provided with a tab means 25 which will react with the side walls of an edge panel to absorbe the torque that is applied to the system during the application of the threaded fastener member 44. Otherwise, the embodiments shown in FIGS. 5 and 6 remain substantially identical to those described above relative to FIGS. 1 and 3.

It should be understood that certain applications may require specific designs of the work panel and that this invention can be adapted to be utilized in these special situations without varying from the basic concepts described herein.

For example, FIGS. 7 through 9 show the use of the invention in a joint configuration which requires a boss formed on one side of the fragile work panel. In this environment a boss 34 is shown to be generally polygonal and extending from the lower surface of a work panel 26a.

The nut member 10a is basically the same general configuration as the nut member 10 in that it includes a tubular section 12a, a flange section 14a and a rim section 16a. However, in this instance the rim section is designed to be polygonally compatible with the boss on the workpiece. The rim is also designed to accommodate the thickness of the boss and still permit the radial spacing and axial spacing desired between the tubular section and the flange as described above.

It should be understood that the same dimensional relationship between the tubular section 12a and a second work panel 36a are recommended for this embodiment of the invention as well in that the tubular section should be designed to have an axial extent such that the extremity 24a may be brought up into abutment with the surface surrounding the aperture 38a in the second workpiece. Aside from the differences in the work panel as including a boss rather than a planar surface in the first embodiment, the invention shown in FIG. 9 is basically the same as that shown in the first embodiment and incorporates all of the inventive concepts described therein.

For purposes of illustrating the applicant's invention, certain embodiments and applications have been disclosed and described. It should be understood that the invention contemplates various changes and modifications without departing from the spirit and scope of the appended claims.

I claim:

1. In a joint designed to clamp a first workpiece to a second, relatively fragile workpiece, the combination of a nut member including a tubular section of predetermined outer diameter and axial length, the tubular section defining first and second extremities, a generally planar, radially extending flange extending from a region adjacent the first extremity, the second, relatively fragile workpiece being of predetermined thickness and including at least one aperture of predetermined transverse dimension and axial dimension sufficient to receive the tubular section of predetermined outer diameter but not appreciably greater than said predetermined outer diameter, the aperture in the fragile workpiece defining first and second extremities generally corresponding to the relative location of the first and second extremities of the tubular section, adhesive securement means interposed between the flange and the planar surface of the fragile workpiece surrounding the at least one aperture, the adhesive joint thus formed being spaced radially, slightly beyond the aperture, rim means integrally interconnecting the annular flange and the first extremity of the tubular section to space the radial innermost region of the planar flange radially from the first extremity as well as axially toward the second extremity, the nut member being secured to the fragile workpiece with the tubular section telescopically associated within the aperture so the second extremity of the tubular section is spaced slightly inwardly from the second extremity of the aperture, the first workpiece including an aperture of less transverse dimension than the aperture in the second workpiece and also less than the predetermined outer diameter of the tubular section so that the second extremity of the tubular section abuts against the peripheral surface around the aperture in the first workpiece when the nut is threadingly associated with a mating externally threaded member and clamping forces applied to the joint while the clamping forces are substantially isolated from the second fragile workpiece due to the layer of adhesive and the spring loaded tubular section so as to create a column between the first workpiece and nut member.

2. The joint of claim 1 wherein the rim is annular and the planar surface surrounding the at least one aperture intersects the first extremity of the at least one aperture and the aperture's axial dimension is equal to the predetermined thickness of the second workpiece.

3. The joint of claim 1 wherein the axial dimension of the at least one aperture is greater than the predetermined thickness through the formation of a boss of limited wall thickness extending from the fragile workpiece.

4. The joint of claim 3 wherein the boss and the rim are compatibly polygonal in configuration serving to prevent rotation of the nut relative to the fragile workpiece.

5. The joint of claim 1 wherein the outer periphery of the tubular section includes protuberances which are dimensions to contact the side wall of the at least one aperture so that ultrasonic energy applied to the joint will create an unstressed mechanical lock between the tubular section and the at least one aperture.

6. A nut device for use in clampingly securing a first workpiece to a second, fragile workpiece, the nut device including a tubular body of predetermined axial extent, the body having thread impressions formed along its inner peripheral surface to accept an externally threaded fastener member, a generally planar flange extending radially from adjacent one extremity of the tubular body and located in a plane perpendicular to the axis of the tubular body, rim means interconnecting the flange to the one extremity toward a second extremity as well as to space the radially innermost periphery of the planar flange radially outwardly from the first extremity of the body, as well as axially toward the second extremity the planar surface of the flange facing the second extremity being coated with a layer of adhesive means to facilitate securement of the nut device to the fragile workpiece with the tubular body telescopically associated with an aperture in the fragile workpiece.

* * * * *